(12) United States Patent
Suzuki et al.

(10) Patent No.: US 6,384,495 B1
(45) Date of Patent: May 7, 2002

(54) MOTOR, METHOD OF MANUFACTURING MOTOR AND ROTARY APPARATUS EQUIPPED WITH MOTOR

(75) Inventors: Takafumi Suzuki; Hiromitsu Goto, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/531,661

(22) Filed: Mar. 20, 2000

(30) Foreign Application Priority Data

Mar. 18, 1999 (JP) ............................................. 11-073236

(51) Int. Cl.$^7$ ............................ H02K 29/00; G11B 5/00
(52) U.S. Cl. ..................... 310/67 R; 310/89; 310/91; 360/99.06; 360/99.08; 360/98.07
(58) Field of Search ................................. 310/67 R, 610, 310/42, 91, 89; 360/99.04, 99.08, 98.07, 99.06

(56) References Cited

U.S. PATENT DOCUMENTS

| | | | | |
|---|---|---|---|---|
| 4,803,576 A | * | 2/1989 | Ohkita et al. | 360/99.08 |
| 5,463,511 A | * | 10/1995 | Nakano et al. | 360/99.08 |
| 5,479,304 A | * | 12/1995 | Morita | 360/98.07 |
| 5,969,448 A | * | 10/1999 | Liu et al. | 310/90 |
| 6,125,098 A | * | 9/2000 | Osawa | 369/266 |
| 6,144,124 A | * | 11/2000 | Nakagawa et al. | 310/67 R |

* cited by examiner

Primary Examiner—Tran Nguyen
(74) Attorney, Agent, or Firm—Adams & Wilks

(57) ABSTRACT

The problem is to provide a motor that a stator coil can be firmly supported with high rigidity and is less in vibration and noise, a method for manufacturing same and a rotary apparatus.

A motor is provided as solving means, which comprises: a base 10 having a cylindrical fit portion 10a; a sleeve 20 having one end firmly fixed in the fit portion 10a; a hub shaft 30 including a hub portion 32 supporting a hard disk, a shaft portion 31 extended from a hub portion 32 center and inserted in the sleeve 20, and an annular portion 33 annularly extended from a peripheral edge of the hub portion 32 in a same direction as the shaft portion 31; a bearing ring 52 coaxially fixed on a tip of the shaft portion 31; an engaging ring 51 fixed at the other end of the sleeve 20 and abutted against the bearing ring 52 thereby regulating axial movement of the shaft portion 31; a rotor magnet 60 fixed on an inner peripheral wall of the annular portion 33; and a stator coil 40 fixed on an outer peripheral wall of the sleeve 20.

10 Claims, 5 Drawing Sheets

MOTOR, METHOD OF MANUFACTURING MOTOR AND ROTARY APPARATUS EQUIPPED WITH MOTOR

BACKGROUND OF THE INVENTION

The present invention relates generally to a motor, a method of manufacturing the motor and a rotary apparatus equipped with the motor and, more particularly, to a motor which can be assembled with accuracy and which can be manufactured easily and at low cost, and to a method of manufacturing the motor and to a rotary apparatus equipped with the motor.

Conventionally, a motor as shown in FIG. 6 has been used for a rotary apparatus, such as a rotary polygon mirror apparatus such as a laser beam printer and an HDD drive.

The motor of FIG. 6 has a base 110 having a fit portion 11*a* in the form of an annular projection, a hub shaft 130 having a shaft 131 extending from a center of a disk-formed hub 132, and a bearing ring 152 secured to a lower end of the shaft 131.

The bearing ring 152 is inserted in the fit portion 11*a* so that the hub shaft 130 can be rotatably supported on the base 110.

A stator coil 140 is fixed on an outer periphery of the fit portion 110*a*.

An annular portion 133 extends downward from a peripheral edge of the hub shaft 130. The annular portion 133 has a rotor magnet 160 fixed on an inner peripheral wall of the annular portion 133.

The stator coil 140 forms a rotating magnetic field so that the rotor magnet 160 can be excited to rotate the hub shaft 130.

The base 110 is fixed on a chassis of a main body apparatus, such as a printer or HDD drive.

The motor described above is required to operate with reduced vibration and noise during rotative drive because of its usual use in a calm place, such as an office. Particularly, an HDD drive is required to provide accurate position data reading by a magnetic head, due to recent density increase of hard disks. Thus, there is a need to reduce vibrations as much as possible from this viewpoint.

Furthermore, the stator magnet of the stator coil 140 or the like and the rotor magnet 160 if not aligned in their magnetic centers require increased power consumption to obtain required rotation. Furthermore, this would cause wow and flutter in rotation leading to a cause of vibrational noise. Consequently, there is a necessity of assembling the parts with accuracy to correctly position between the stator magnet and the rotor magnet 160.

Meanwhile, for a motor for use in an HDD drive, the distance should be kept at a predetermined length between a hard disk to be loaded and a magnetic head. Consequently, it is required to exactly position in height of the hub in order for supporting a hard disk with reference to the base.

In the meanwhile, in the conventional motor as shown in FIG. 6, the stator coil 140 is a most serious vibration source. Because the stator coil 140 is mounted on the base 110, vibration on the stator coil 140 is directly conveyed to the base 110. The vibration is transmitted through the base 110 onto a main body apparatus, such as a printer or HDD drive, causing noise to the outside. In this manner, the prior art motor involves a problem that vibration is directly conveyed to the outside thus resulting in noise.

Also, in the above motor, the base 110 is fixed with a stator coil 140 and the hub shaft 130 with a rotor magnet 160. Consequently, the adjustment in height of the base 110 and the hub shaft 130 also determines a positional relationship between the stator coil 140 and the rotor magnet 160. Due to this, the stator coil 140 and the rotor magnet 160 are almost determined in their magnetic center position during forming the parts. It is accordingly impossible during assembling to adjust an error of mounting the stator coil 140 to the base 110 or an error of attaching the rotor magnet 160 to the hub shaft 130. Thus, in the above motor, there is a problem that it is difficult to manufacture an precise product with respective positional relationships correctly kept between the base 110 and the hub shaft 130 and between the stator coil 140 and the rotor magnet 160.

Furthermore, in the above motor the base 110 is fixed with the stator coil 140 and the hub shaft 130 is fixed with the rotor magnet. The motor characteristics (electrical and vibration characteristics, etc.) can be measured first on a final product after assembling the hub shaft 130 on the base 110. When poor assembly is detected, the product must be scrapped in its entirety, including the expensive base, resulting in a reduction of efficiency and increase in cost.

SUMMARY OF THE INVENTION

The present invention has been made in order to solve the above problems in the conventional art. It is an object of the present invention to provide a motor which operates with reduced noise during driving and which can be manufactured easily, efficiently and inexpensively with accuracy, and to a method of manufacturing the motor and a rotary apparatus equipped with the motor.

The motor of the present invention comprises; a columnar support member; a base formed separate from the support member and having a fit portion in which the support member at one end is fitted; a rotor member rotatably supported coaxially to the support member; a regulating means for regulating a position of the rotor member in an axial direction relative to the support member; a magnet fixed on one of the support member and the rotor member; and a plurality of electromagnets fixed facable to the magnets on the other of said support member and the rotor member to form a rotating magnetic field so that the magnet is excited to rotate the rotor member. This achieves the above object.

In the motor of the invention, the support member is fixed with one of the magnet and the electromagnet, and this support member is formed as a separate member from the base. Due to this, it is possible during driving to avoid transmission, directly from the support member to the base, of vibration caused by attracting and repelling forces due to a magnetic field formed by the stator coil and the magnet or vibration due to deviation in a magnetic field center. Accordingly, noise during driving is reduced.

In the motor of the invention, the magnet is fixed on one of the support member and the rotor member and the electromagnets are fixed on the other, and the support member and rotor member are formed separately from the base. The axial position of the support member relative to the base is determined by a positional relationship between the support member and the base. Also, the axial positions of the magnet and electromagnets are determined by a positional relationship between the support member and the rotor member, regardless of the base. Due to this, it is possible to independently conduct, without mutual affection, axial aligning between the base and the support member and between the electromagnets and the magnet. Accordingly, the motor of the invention can be manufactured easily and with favorable assembling accuracy.

Also, after fixing the electromagnets and magnet on the rotor member and support member, it is possible to align between the base and the rotor member and between the electromagnets and the magnet. Accordingly, it is possible to rectify an error occurring upon fixing the electromagnet and magnet on the rotor member and support member or an error caused in forming the parts. Therefore, the motor of the invention can be manufactured easily and with favored assembling accuracy.

In this manner, manufacture with favorable accuracy and accurate alignment between the electromagnets and the magnet are possible to conduct, making possible to avoid noise to be caused due to deviation in magnetic field center.

In the motor of the invention, the magnet is fixed on one of the support member and the rotor member, and the electromagnets are fixed on the other, wherein the support member and the rotor member are formed separately from the base. Accordingly, it is possible to energize the coil and conduct a test as a motor, such as measurement of electrical and vibration characteristics after fixing the magnet and electromagnets on the support member and rotor member but before fixing the support member on the base. Only an acceptable assembly can be fit with the base to provide a final product. Accordingly, it is possible to eliminate a useless process of fitting an unacceptable assembly to the base, eliminating useless use of bases. Thus, unintentional increase of cost can be avoided.

In a motor of the invention, the support member is in a sleeve form with a hollow space to have one end communicating the hollow space to an outside and the other end fitted in the fit portion; the rotor member having a shaft portion inserted in the hollow space of the support member from a side of the one end, an extension portion radially extended from the shaft portion to an outer side of the one end of the support member, and an annular portion extended from an peripheral edge of the extension portion toward the shaft portion; the magnet being fixed on one of an outer peripheral wall of the support member and an inner peripheral wall of the annular portion; and the electromagnets being fixed on the other of the outer peripheral wall of the support member and the inner peripheral wall of the annular portion.

The regulating means comprises a bearing ring coaxially fixed on a tip of the shaft portion and an engaging ring fixed on the sleeve to abut against the bearing ring on a side of the extension portion rather than the bearing ring.

A motor according to the invention can be manufactured by a motor manufacturing method including: a first process of fixing the magnet on any one of the support member and the rotor member; a second process of fixing the electromagnets on the other of the support member and the rotor member; a third process of forming, after the first and second processes, a motor unit that the rotor member is regulated in axial position relative to the support member by the regulating means into a state that a magnetic center of the magnet and a magnetic center of the electromagnets are aligned in axial position; and a fourth process of fitting and fixing, after the third process, the support member in the fit portion of the base.

A rotary apparatus according to the invention has a motor of the invention.

The rotary apparatus of the invention thus provided with a motor of the invention is reduced in noise and can be accurately manufactured easily and efficiently and at low cost.

DETAILED DESCRIPTION OF THE PREFERRED EMBODIMENTS

The present invention will now be described with reference to the drawings.

Figure 1:
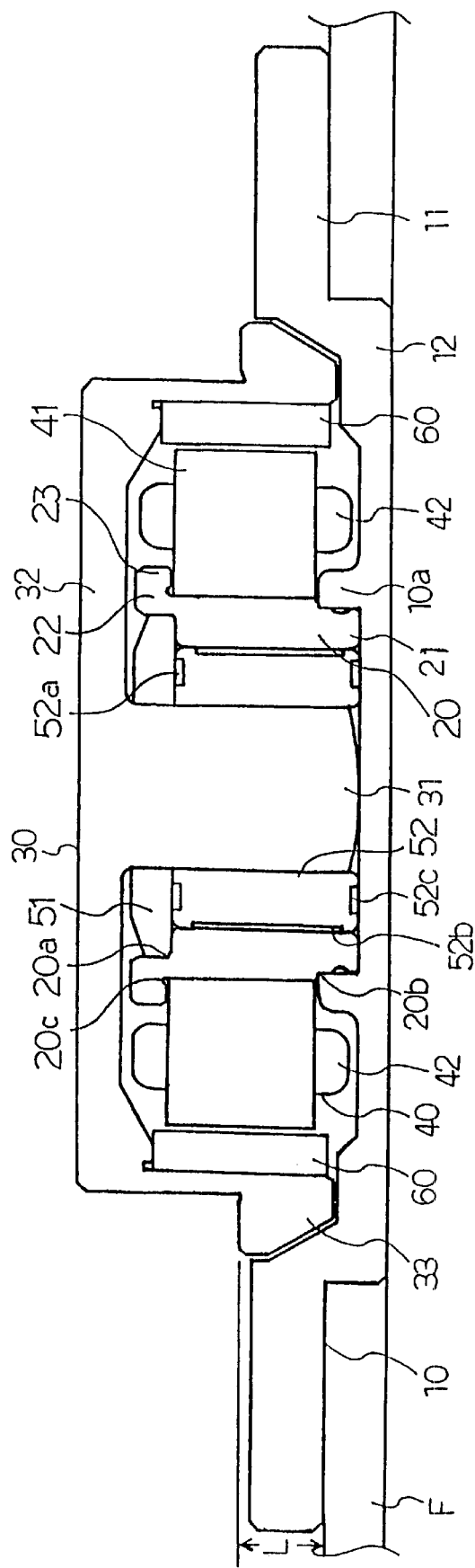
FIG. 1 is an axial sectional direction view showing one embodiment of a motor of the present invention.

FIG. 1 is an axial direction sectional view of a motor according to one embodiment of the invention.

The motor of this embodiment is to be used for a hard disk drive (HDD), and includes as shown in FIG. 1 a base 10 having a fit portion 10a formed at a center thereof, a cylindrical sleeve (support member) 20 closed at one end, and a hub shaft (rotor member) 30 to support and rotate a hard disk.

The base 10 has a lower portion 12 in a disk form and a flange 11 extended radially outward from the lower portion 12 to form a base 10 peripheral edge higher than the lower portion 12. The lower portion 12 has the fit portion 10a which comprises an annularly protruding fit portion formed at a center of the lower portion 12.

The base 10 at its bottom portion 12 is fitted in a mount hole formed in a frame F of an HDD so that the flange 11 is fixed in the HDD frame F in a state of surface contact therewith.

The sleeve 20 at its one end 21 is fitted in the fit portion 10a of the base 10 and fixed in the base 10 through an adhesive. The other end of the sleeve 20 stands directed upward (oppositely to the base 10). The other end of the sleeve 20 is made as a large diameter portion 22. This change of diameter provides the sleeve 20 with respective steps (first step 20a and second step 20b) in inner and outer peripheral walls. The other end has a top edge that is increased in thickness toward radially outward thereof, forming a coil engaging edge 23. This thickness change provides a step (third step 20c) in the outer peripheral wall.

The sleeve 20 is fixed, at its large diameter portion 22, with a stator coil (electromagnet) 40 from radially outward.

The stator coil 40 is formed by a yoke 41 and a coil (electromagnet) 42 having a wire wound around the yoke 41.

The yoke 41 has an annular portion having a bore at a center and a winding portion radially outwardly extended from a plurality of circumferentially equally divided points of the annular portion. The winding portion is wound around with a wire, thus forming a coil 42.

The sleeve 20 is inserted in the bore of the yoke 41. The yoke 41 at its inner peripheral wall is coaxially secured to the sleeve 20 in a state where the yoke 41 is in contact with the third step 20c of the sleeve 20. The coil 42 is arranged on a coaxial circumference to the sleeve 20 and above the base 10. The coil 42 when energized forms a rotating magnetic field.

A generally ring-shaped engaging member 51 (hereinafter "engaging ring") is provided at the top edge of the sleeve 20. The engaging ring 51 has one end resting on the first step 20*a* and an outer peripheral wall fixed on an inner peripheral surface of the sleeve 20.

The hub shaft 30 has a cylindrical shaft portion 31, a disk-formed hub (extended portion) portion 32 extended from one end of the shaft portion 31, and an annular portion 33 extended downward from a peripheral edge of the hub portion 32.

The shaft portion 31 is inserted in the engaging ring 51. The shaft portion 31 at the other end is mounted and fixed with a generally ring-shaped bearing member 51 (hereinafter "bearing ring").

The hub portion 32 is arranged in an open space at above the top edge of the sleeve 20 to cover above the base bottom portion 12.

The hub portion 32 has a top surface having a peripheral edge formed low in height to support a hard disk.

A plurality of rotor magnets 60 are fixed at an equal interval on an inner peripheral wall of the annular portion 33. These rotor magnets 60 are arranged such that their magnetic center is in the same axial direction as that of the stator coil 40, whereby it can be excited by a rotating magnetic field formed by the stator coil 40.

The bearing ring 52 has grooves for producing dynamic pressure 52*a*, 52*b*, 52*c* respectively formed in an outer peripheral surface, a top surface and a bottom surface. Oil is filled in respective gaps between the bearing ring 52 and the engaging ring 51, between the bearing ring 52 and the sleeve 20 and between one end surface of the shaft portion 31 and the sleeve 20.

When the hub shaft 30 rotates, oil is entrained to produce dynamic pressure through the dynamic pressure producing grooves 52*a*, 52*b* 52*c* into between an outer peripheral surface of the bearing ring 52 and an inner peripheral surface of the sleeve 20, between bottom surface of the bearing ring 52 and one end surface of the sleeve 20 and between a top surface of the bearing ring 52 and a bottom surface of the engaging ring 51. Due to this, the bearing ring 52 is supported floating in a state having slight gaps respectively with the inner peripheral surface of the sleeve 20, the one end surface of the sleeve 20 and the bottom surface of the engaging ring 51.

In the motor of this embodiment constructed as above, when the stator coil 40 is energized to produce a rotating magnetic field, the rotor magnets 60 are excited by the rotating magnetic field to cause rotation of the hub shaft 30.

This rotation entrains oil into the dynamic pressure producing grooves 52*a*, 52*b*, 52*c* to produce dynamic pressure. When the rotation increases higher than a predetermined speed, the bearing ring 52 and shaft portion 31 are supported in a state having slight gaps respectively with the inner peripheral surface of the sleeve 20, the one end surface of the sleeve 20 and the bottom surface of the engaging ring 51. Thus, the hub shaft 30 and the bearing ring 52 rotate in a floating state.

Now explained is a method for manufacturing a motor of the above embodiment as one embodiment of a motor manufacturing method of the invention.

The motor of the embodiment is manufactured by the following processes.

First, a stator coil 40 is fixed to an top edge of the sleeve 20 from radial outward thereof. At this time, the stator coil 40 is abutted at its top surface against a coil engaging edge 23 from below thereby axially positioned, and then fixed on an outer peripheral wall of the sleeve 20 through an adhesive.

Meanwhile, rotor magnets 60 are fixed onto an annular portion 33 of the hub shaft 30 from a radially inward thereof.

Subsequently, a bearing ring 52 and an engaging ring 51 are placed in a hollow space of the sleeve 20. The hub shaft 30 at its shaft part 31 is inserted in the hollow space of the bearing ring 52 and engaging ring 51. The engaging ring 51 at its inner peripheral wall is fixed on the shaft portion 31. At this time, the stator coil 40 fixed on the sleeve 20 and the rotor magnets 60 fixed on the hub shaft 30 are fixed by axially adjusting the position of the bearing ring 52 and shaft portion 31 so that their magnetic centers are aligned with in an axial direction. The engaging ring 51 at its outer peripheral wall is fixed on the sleeve 20.

At the same time, oil is filled to respective gaps of between the bearing ring 52 and the engaging ring 51, between the bearing ring 52 and the sleeve 20 and between the one end of the shaft 31 and the sleeve 20.

Next, the sleeve 20 at its one end 21 is inserted in a fit portion 10*a* of the base 10. Then, the distance between a flange 11 lower surface of the base 10 and a peripheral edge top surface of the hub shaft 30 is adjusted to a predetermined distance. Thereafter, the sleeve 20 at its one end 21 is fixed by adhesion to the base 10, thus ending motor manufacture.

In this manner, in the motor of this embodiment, the stator coil 40 is fixed on the sleeve 20 and the rotor magnets 60 are on the hub shaft 30 wherein the sleeve 20, the hub shaft 30 and the base 10 are separately made and thereafter assembled and fixed one another.

Consequently, the relative axial positioning of the sleeve 20 and hub shaft 30 is independent of and not affected from the relative axial positioning of the base 10 and hub shaft 30. The axial positional relationship between the sleeve 20 and the hub shaft 30 can be determined and fixed to respectively have the stator coil 40 and the rotor magnets 60 that are axially aligned in magnetic center with each other. Furthermore, the axial positional relationship between the base 10 and the hub shaft 30 can be determined and fixed such that the distance from the base 10 to a hard disk support surface is at a predetermined distance. Accordingly, the present embodiment is capable of manufacturing a product easily and accurately.

Also, rectification is possible for a mount error caused due to fixing the stator coil 40 to the sleeve 20, a mount error due to attaching the rotor magnets 60 to the hub shaft 30, and forming errors on the part members. The axial positional relationship between the sleeve 20 and the hub shaft 30 can be determined and fixed to respectively have the stator coil 40 and the rotor magnets 60 that are axially aligned in magnetic center with each other. Furthermore, the axial positional relationship between the base 10 and the hub shaft 30 can be determined and fixed such that the distance from the base 10 to a hard disk support surface is at a predetermined length. Accordingly, the present embodiment is also capable of a product easily and accurately from this viewpoint.

According to the present embodiment, the stator coil 40 fixed on the sleeve 20 and the rotor magnets 60 fixed on the hub shaft 30 can be easily aligned in their magnetic centers in the axial direction. This can avoid vibration or noise due to deviation between the magnetic centers.

According to the present embodiment, the sleeve 20 supporting the stator coil 40 and the base 10 are formed and assembled as separate members. Accordingly, during rotation and drive, vibration occurring on the stator coil 40 is not directly transmitted but attenuated through between the sleeve 20 and the base 10, thereby reducing exterior vibration or noise.

In the motor of the invention, the rotor magnets 60 are fixed on the hub shaft 30 and the stator coil 40 is on the sleeve 20 wherein the hub shaft 30 and the sleeve 20 are formed as separate members from the base 10. After fixing the rotor magnets 60 and electromagnet on the hub shaft 30 and sleeve 20, prior to fixing them to the base 10 they can be conducted testing as a motor, such as measurements of electric and vibrational characteristics, by energizing the coil. Thus, only an acceptable assembly can be fitted and fixed with the base 10 to provide a final product. It is accordingly possible to eliminate useless process, such as fitting an unacceptable assembly to the base 10. At the same time, it is possible to avoid the base 10 from scrapping the base on account of a poor motor. Accordingly, non-usefully use or mounting of the base is eliminated, thus avoiding unintentional increase of cost.

Now, a rotary apparatus adopting the above motor will be described as one embodiment of a rotary apparatus of the invention.

Figure 2A:
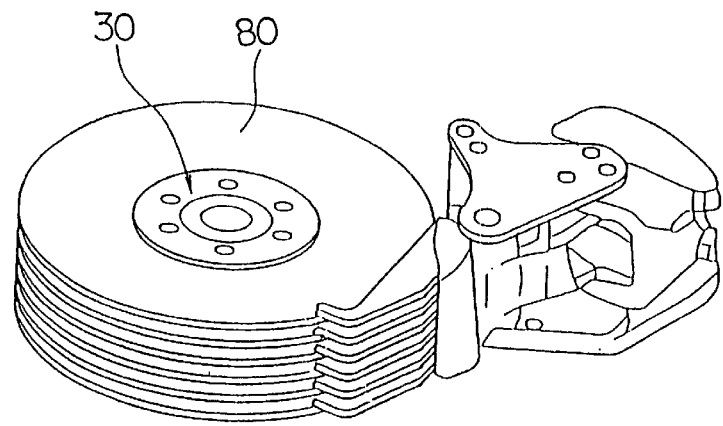
FIG. 2A is an essential part schematic external view showing the one embodiment of the invention.
Figure 2B:
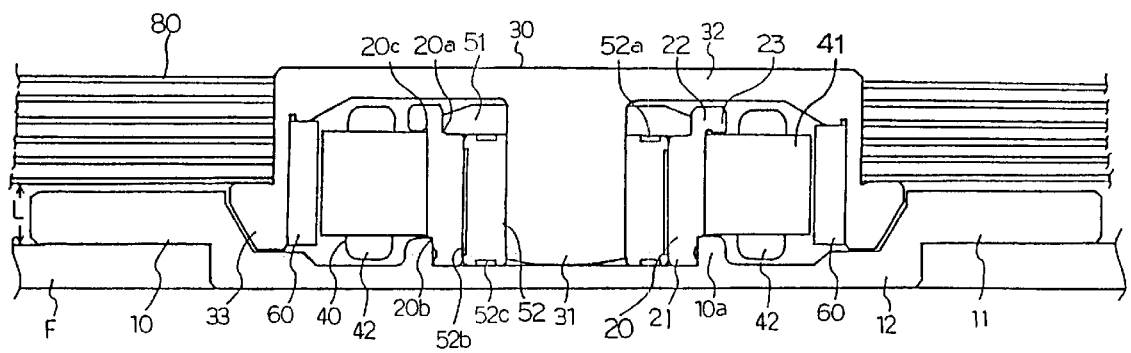
FIG. 2B is an essential part schematic sectional view showing the one embodiment of the invention.

FIG. 2 is a figure illustrating a hard disk drive as one embodiment of a rotary apparatus of the invention, wherein FIG. 2A is a perspective view thereof and FIG. 2B an axial sectional view.

As shown in FIG. 2, the rotary apparatus (hard disk drive) has the motor 1 of the above embodiment. The motor 1 has a base 10 adapted to be fitted and fixed on a frame F of the hard disk drive. A hard disk 80 is supported in a peripheral edge of the hub shaft 30 so that it can be rotated together with the hub shaft 30.

The hard disk drive of this embodiment adopting the above motor 1 is reduced in vibration on the motor 1. Also, the vibration is less transmitted through the base 10, thus reducing noise during drive. Further, because the distance L between the frame F and the hard disk is kept with accuracy, writing-in and reading-out is possible with reliability for a disk large in size or recording density.

It should be noted that the invention is not limited to the above embodiment but can be changed in various ways without departing from the gist of invention.

Figure 3:
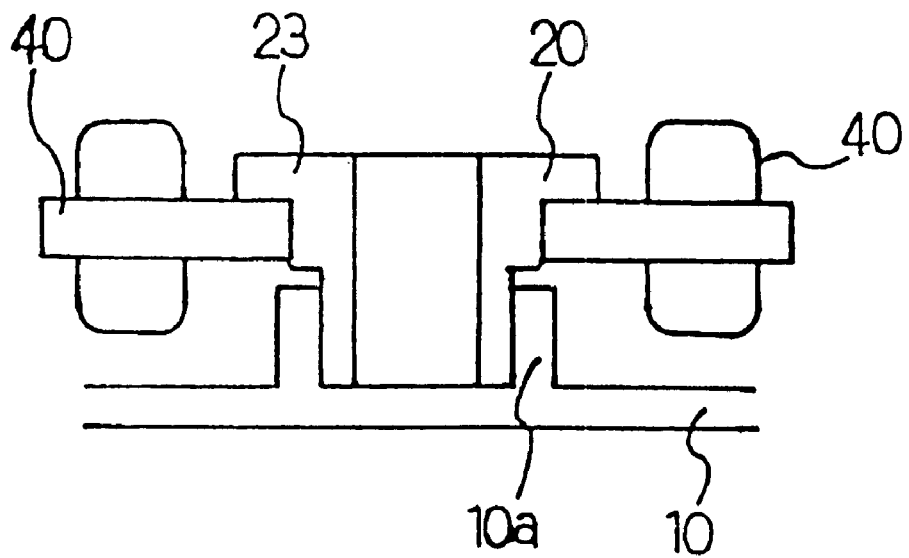
FIG. 3 is an axial essential part sectional view of another embodiment of a motor of the invention.

For example, although in the above embodiment the sleeve 20 has a large diameter portion 22, the large diameter portion may be omitted and an inner diameter thereof be equal throughout the axial length thereof as shown in FIG. 3. In such a case, the coil engaging edge 23 has a thickness increased in a radial direction thus providing an effect of less deformation in the sleeve 20. The effect that the coil engaging edge 23 facilitates positioning of the stator coil 40 is provided similarly to the above embodiment.

Figure 4:
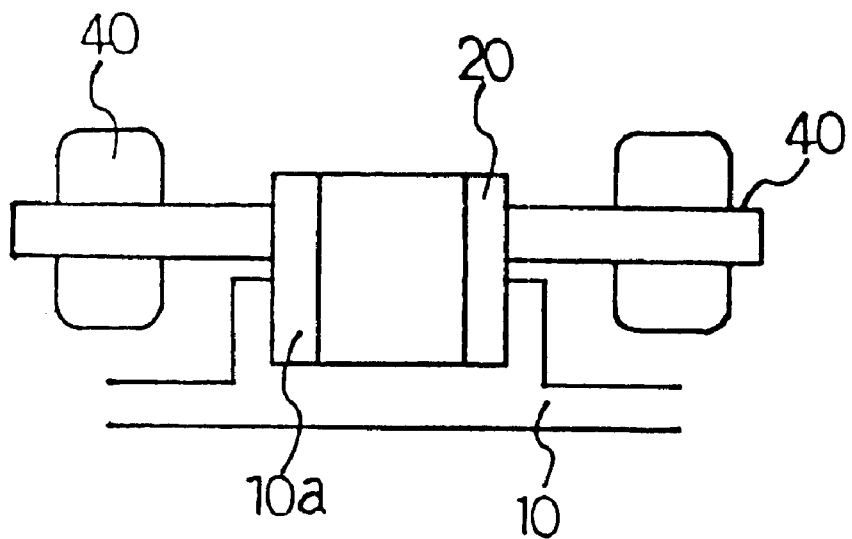
FIG. 4 is an axial essential part sectional view of another embodiment of a motor of the invention.

Also, as shown in FIG. 4 the sleeve 20 may be made equal in inner diameter throughout the axial length without providing a large diameter portion, and equal also in outer diameter throughout the length without providing a coil engaging edge 23. In such a case, a jig may be used in positioning the stator coil 40.

Figure 5:
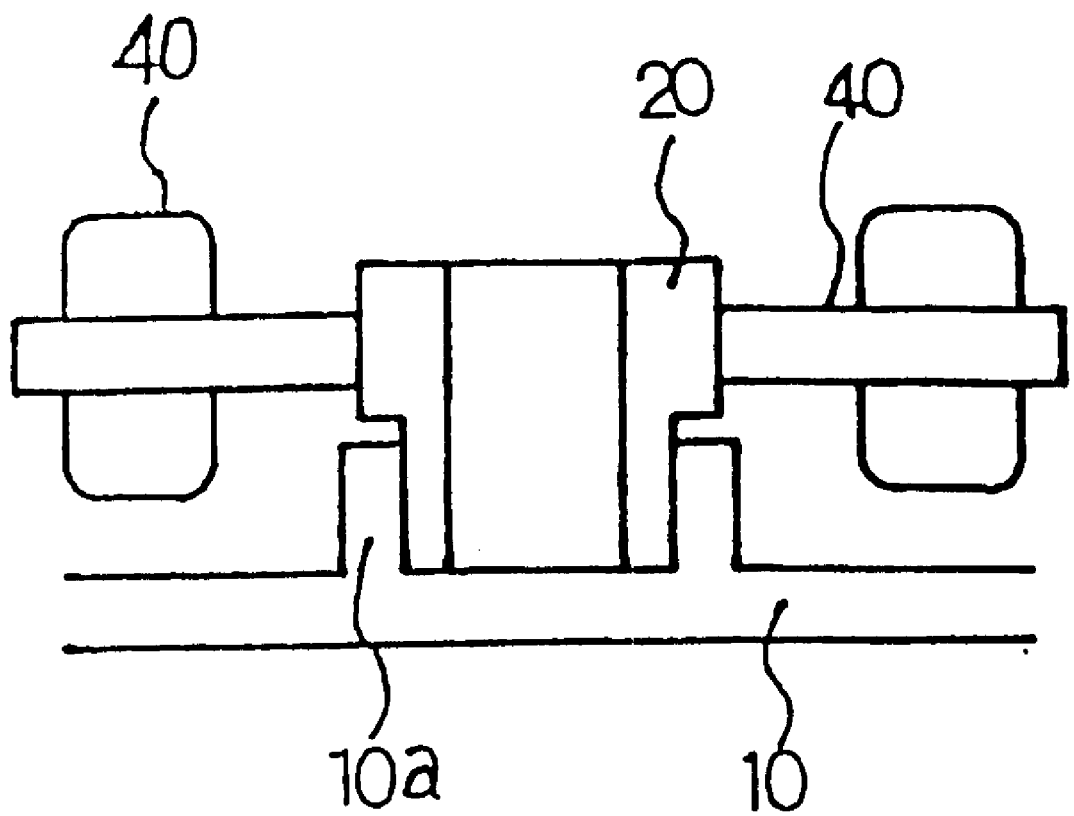
FIG. 5 is an axial essential part sectional view of another embodiment of a motor of the invention.
Figure 6:
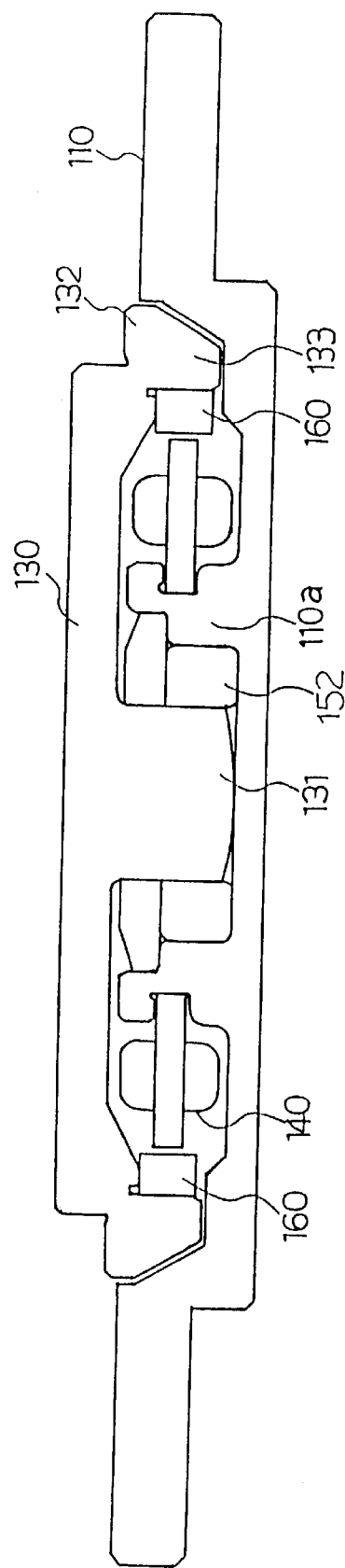
FIG. 6 is an axial sectional view showing a motor of a prior art.

Furthermore, as shown in FIG. 5 the sleeve 20 may be not provided with a large diameter portion and coil engaging edge but increased in outer diameter at its top edge to have an increased thickness and hence strength, wherein the stator coil is fixed on the top edge.

Incidentally, where a large diameter portion is not provided as shown in FIG. 3 to FIG. 5, the engaging ring 51 may be fixed on a top surface of the sleeve 20 because the engaging ring 51 is difficult to fix on the sleeve inner peripheral wall.

In the above embodiment, the sleeve 20 is fixed on the base 10 through an adhesive. However, the invention is not limited to that structure but the sleeve 20 can be fixed by press-fit, shrink-fit or screwing. For example, thread may be provided to the outer peripheral surface of the sleeve 20 and the fit portion 10a of the base so that the base 10 can be screwed to the fit portion 10a. Meanwhile, the sleeve 20 and the base may be adhered together by screwing the sleeve 20 to a proper axial position of the base 10. Also, the base may be opened with a hole in place of the fit part.

In the above embodiment, bearing means (engaging ring 51 and bearing ring 52) supporting the hub shaft 30 as a rotor member serves also as regulating means. Alternatively, similar regulating means may be provided separately from the bearing means.

Also, in the above embodiment the sleeve 20 as a support member supporting the electromagnet serves as part of receiving means cooperating to the bearing ring 52 to produce dynamic pressure. However, a similar bearing means may be provided separately from the sleeve 20.

The rotor magnet 60 may be a permanent magnet or electromagnet. Also, a plurality of magnets or one radially-anisotropic magnet in a cylinder form may be fixed on the inner peripheral wall of the hub shaft 30.

In the above embodiment the rotor member (hub shaft 30) is supported at its shaft by the support member (sleeve 20) through an oil dynamic pressure bearing. However, the bearing is not limited to this but may be made as an air dynamic pressure bearing, static pressure bearing, roll bearing, slide bearing or the like. For a dynamic pressure bearing, there are no dynamic pressure producing grooves 52a, 52b, 52c in the bearing ring 52. It is possible to provide so-called a non-true-circle planar bearing that has a gradient formed in an inner peripheral surface in a state the fit portion 10a of the base receives a projection formed in an outer peripheral wall of the sleeve 20, or so-called a segment bearing arranged with a plurality of segments in place of the bearing ring 52.

In the above embodiment, the motor is of an outer rotor type that the rotor magnets 60 are arranged at radially outward relative to the electromagnet. The invention is not limited to this but may be formed as an inner rotor type motor, for example, the hub portion 32. Also, the motor may be made as an axial gap type instead of the radial gap type. In such cases, however, there is a need to change the form of various parts or add members, e.g. the sleeve 20 is provided with a first peripheral wall fixing an electromagnet and a second peripheral wall cooperating with the bearing ring 52 to produce dynamic pressure.

It should be noted that, in the present specification, "rotation" of the rotor member or bearing ring means relative rotation to the base or sleeve. Accordingly, in the present invention the hub portion 32 of the rotor member 30 is fixed to an external member and the rotor member 30 is fixed to the external member, wherein a motor or rotary apparatus is included that the sleeve 20 rotates relative to the outside.

In the above embodiment, the hard disk apparatus is made to support and rotate a plurality of disks. It is however possible to support and rotate only one disk.

In the above embodiment, the rotary apparatus is the hard disk drive. However, the invention is not limited to this. The rotary apparatus may be made as another disk drive, such as a CD-ROM drive, a rotary polygon mirror apparatus having a polygon mirror mounted on a spindle of a spindle motor, or other apparatuses.

As discussed above, according to the motor and rotary apparatus of the invention, noise can be reduced during drive of the motor, assembly of the motor can be accurately achieved, and production is achieved easily, efficiently and at low cost.

What is claimed is:

1. A motor comprising: a base having a fit portion; a columnar support member formed separately from the base and having one end fitted in and connected to the fit portion of the base; a rotor member supported for rotation relative to and coaxial with the support member; regulating means for regulating a position of the rotor member in an axial direction relative to the support member; a magnet connected to one of the support member and the rotor member; and a plurality of electromagnets connected to the other of the support member and the rotor member and in confronting relation to the magnet for generating a rotational magnetic field that coacts with the magnet to rotate the rotor member; wherein the support member comprises a sleeve having a hollow space, a first end, and a second end disposed in the fit portion of the base; wherein the rotor member has a shaft portion disposed in the hollow space of the support member from the first end thereof, an extension portion extending radially from the shaft portion and outwardly from the first end of the support member, and an annular portion extending from a peripheral edge of the extension portion toward the shaft portion; wherein the magnet is connected to one of an outer peripheral wall of the support member and an inner peripheral wall of the annular portion of the rotor member; wherein the electromagnets are connected to the other of the outer peripheral wall of the support member and the inner peripheral wall of the annular portion of the rotor member; and wherein the regulating means comprises a bearing ring connected to the shaft portion of the rotor member in coaxial relation thereto and an engaging ring connected to the sleeve.

2. A motor comprising: a base having a fit portion; a columnar support member formed separately from the base and having one end fitted in and connected to the fit portion of the base; a rotor member supported for rotation relative to and coaxial with the support member; regulating means for regulating a position of the rotor member in an axial direction relative to the support member, the regulating means comprising a bearing ring connected to a shaft portion of the rotor member in coaxial relation thereto and an engaging ring connected to the support member; a magnet connected to one of the support member and the rotor member; and a plurality of electromagnets connected to the other of the support member and the rotor member and in confronting relation to the magnet for generating a rotational magnetic field that coacts with the magnet to rotate the rotor member.

3. A motor comprising: a base having a fit portion; a columnar support member formed separately from the base and having a first end fitted in and connected to the fit portion of the base and a second end; a rotor member supported for rotation relative to and coaxial with the support member, the rotor member having a shaft portion disposed in coaxial relation with the support member; regulating means for regulating a position of the rotor member in an axial direction relative to the support member, the regulating means comprising a bearing member disposed between the shaft portion of the rotor member and the support member in coaxial relation thereto and an engaging member connected to the second end of the support member and disposed in abutment with the bearing member; a magnet connected to one of the support member and the rotor member; and a plurality of electromagnets connected to the other of the support member and the rotor member and in confronting relation to the magnet for generating a rotational magnetic field that coacts with the magnet to rotate the rotor member.

4. A rotary apparatus comprising: a motor as set forth in claim 1, and an object mounted on the rotor member of the motor for rotation therewith.

5. A motor comprising: a base having an annular projection; a support member having a first end connected to the annular projection of the base and a second end; a bearing member having a first end disposed in the annular projection of the base and a second end; a rotor member supported for rotation relative to the support member about a rotational axis via the bearing member, the rotor member having a shaft portion disposed in coaxial relation to the support member and the bearing member; an engaging member connected to the second end of the support member and disposed in contact with the second end of the bearing member for regulating movement of the shaft portion of the rotor member along the rotational axis; a magnet connected to one of the support member and the rotor member; and at least one electromagnet connected to the other of the support member and the rotor member and disposed in confronting relation to the magnet for generating a rotational magnetic field that coacts with the magnet to rotate the rotor member.

6. A motor according to claim 5; wherein the electromagnet is connected directly to the support member.

7. A motor according to claim 5; wherein the electromagnet does not contact the base.

8. A motor according to claim 5; wherein the support member and the base are made from separate pieces of material.

9. A rotary apparatus comprising: a motor as set forth in claim 5; and an object mounted on the rotor member of the motor for rotation therewith.

10. A method of manufacturing a motor, comprising the steps of: providing a base having an annular projection; connecting a first end of a support member to the annular projection of the base; connecting one of a magnet and at least one electromagnet to the support member; providing a rotor member having a shaft portion and an extension portion extending from the shaft portion; connecting the other of the magnet and the at least one electromagnet to the extension portion of the rotor member; mounting a bearing member on the shaft portion of the rotor member; mounting the rotor member for rotation relative to the base and the support member through the bearing member so that a first end of the bearing member is disposed in the annular projection of the base; and connecting an engaging member to a second end of the support member opposite the first end thereof so that magnetic centers of the magnet and the electromagnet are aligned in a direction of a rotational axis of the rotor member.

* * * * *